UNITED STATES PATENT OFFICE.

HEINRICH SCHLINCK, OF LUDWIGSHAFEN, GERMANY.

PROCESS OF PURIFYING OILS OR FATS.

SPECIFICATION forming part of Letters Patent No. 653,041, dated July 3, 1900.

Application filed October 4, 1899. Serial No. 732,531. (No specimens.)

*To all whom it may concern:*

Be it known that I, HEINRICH SCHLINCK, a citizen of the Empire of Germany, residing in Ludwigshafen, in the Empire of Germany, have invented certain new and useful Improvements in Processes of Purifying Oils, of which the following is a specification.

This invention relates to the purification of oils and fats, and more particularly vegetable and animal oils which are intended for human consumption, the object of the invention being to remove from the oils the strong odor and objectionable taste which many of them in a crude state possess and at the same time to render them less liable to turn rancid.

The invention consists, broadly, of a process of purifying oils comprising the following steps: first, saponifying the fatty acids contained in the oil to be purified; second, removing said saponified acids therefrom, and, lastly, subjecting the oil to the action of superheated steam, so that the odorous matters which it contains are expelled; and the invention consists more specifically in certain steps more particularly described and claimed hereinafter.

Processes having for their object the removal of the odor and taste from oils of the class under consideration were for some time based upon a simple agitation and heating of the oil in an open vessel and subsequent treatment with alkali. Despite the latter step oils purified by this process were possessed of a tendency to readily turn rancid. Ritserth in his *Investigations Upon the Rancidity of Fats*, 1890, pages 46 and 48, showed that the tendency to turn rancid is the result of a direct oxidation by the oxygen of the air of substances contained in the oil. This tendency is aggravated when the oil is heated in the presence of air. Hence later processes were based upon the exclusion of air from the oil, and this necessitated the use of complicated and expensive apparatus; but even with these processes it has been impossible to obtain from the ordinary cocoanut-oil, for example, which contains about four per cent. of free fatty acids, a palatable fat not readily turning rancid. The present process is not based upon the exclusion of air from the oil during the process, but is based instead upon the fact that the tendency of the oils to turn rancid is due to their contained fatty acids, and after these are neutralized and separated out the subsequent heating of the neutral oil does not tend to turn it rancid. The use of complicated apparatus is avoided and a process provided by which a valuable food product can be obtained from even the lowest grades of commercial oils and fats containing a high percentage of free fatty acids and albuminous and other odoriferous matters.

In practically carrying out the new process a quantity of the crude oil and an equal quantity of water are placed in a boiling vessel and any suitable alkali—such as sodium, potassium, or magnesium carbonate—added in quantity slightly in excess of that necessary for saponifying the free fatty acids contained in the oil. The mixture is then heated under continuous agitation up to the boiling-point. The oil and the soap solution thereby formed are then allowed to stand until they separate by gravity, which usually requires about three hours. The soap solution is then drawn off through a faucet at the lower portion of the vessel and conducted into separating-vats, in which the contained fatty acids may be separated from the solution by sulfuric acid or in any suitable manner. To the oil remaining in the boiling vessel is again added an equlvalent quantity of water, the mixture again agitated and raised to the boiling-point, and the soap solution, which is this time of less strength than that of the first boiling, again allowed to separate, after which it is drawn off and disposed of in like manner as the first or in any manner desired. These washings are continued in the manner described until the washing-water runs off perfectly clear. By this continued washing the fatty acids, which are neutralized by the alkali and form part of the soap solution, are removed from the oil. The so-purified oil is then treated for the removal of the odors still contained in the same by subjecting it to the action of superheated steam, in a wrought-iron apparatus provided with a cap and cooler, up to a temperature of from 180° to 200° centigrade, until a test taken from the still has neither smell nor taste, which, according to the kind and quality of the oil, takes from three to six hours. The volatile portions which pass off with the superheated steam are condensed in the cooler and float as a thin fatty film on the water in the receiving-vat, from which they can be readily ladled off from time to time.

Having thus described my invention, I claim as new and desire to secure by Letters Patent—

1. The herein-described process of purifying vegetable and animal oils and fats, which consists in the following steps: first, saponifying the free fatty acids contained in the oil, second, separating the soap solution thereby formed from the oil, and lastly subjecting the acidless oil to the action of superheated steam for deodorizing the same, substantially as set forth.

2. The herein-described process of purifying vegetable and animal oils and fats, which consists in the following steps: first, saponifying the free fatty acids contained in the oil by a suitable alkali, second, separating the soap solution from the oil, third, subjecting the remaining oil to successive washing operations, and lastly, subjecting the so-washed acidless oil to the action of superheated steam, so as to remove the volatile ingredients contained in the same, substantially as set forth.

In testimony that I claim the foregoing as my invention I have signed my name in presence of two subscribing witnesses.

HEINRICH SCHLINCK.

Witnesses:
KARL FÜRNITZ,
JAKOB MUNZER.